United States Patent
Ahn

(10) Patent No.: US 11,151,801 B2
(45) Date of Patent: Oct. 19, 2021

(54) ELECTRONIC DEVICE FOR DISPLAYING ADDITIONAL OBJECT IN AUGMENTED REALITY IMAGE, AND METHOD FOR DRIVING ELECTRONIC DEVICE

(71) Applicant: Samsung Electronics Co., Ltd., Gyeonggi-do (KR)

(72) Inventor: Stephanie Kim Ahn, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/265,880

(22) PCT Filed: Aug. 5, 2019

(86) PCT No.: PCT/KR2019/009724
§ 371 (c)(1),
(2) Date: Feb. 4, 2021

(87) PCT Pub. No.: WO2020/050506
PCT Pub. Date: Mar. 12, 2020

(65) Prior Publication Data
US 2021/0241537 A1    Aug. 5, 2021

(30) Foreign Application Priority Data

Sep. 4, 2018  (KR) .................. 10-2018-0105100

(51) Int. Cl.
*G06T 19/00*       (2011.01)
*G02B 27/01*       (2006.01)
(Continued)

(52) U.S. Cl.
CPC ........ *G06T 19/006* (2013.01); *G02B 27/0172* (2013.01); *G06K 9/00201* (2013.01);
(Continued)

(58) Field of Classification Search
None
See application file for complete search history.

(56) References Cited

U.S. PATENT DOCUMENTS 10,339,383 B2   7/2019  Lee
2012/0062595 A1  3/2012  Oh et al.
(Continued)

FOREIGN PATENT DOCUMENTS

JP    2012-044930 A     3/2012
KR    10-1337555 B1    12/2013
(Continued)

OTHER PUBLICATIONS

Lee et al., "Using a HHD with a HMD for Mobile AR Interaction", IEEE, 2013. (Year: 2013).*

*Primary Examiner* — Nicholas R Wilson
(74) *Attorney, Agent, or Firm* — Cha & Reiter, LLC

(57) ABSTRACT

An electronic device includes a communication module, a display, and at least one processor operatively connected with the communication module and the display. The at least one processor may be configured to receive an augmented reality image from at least one external device which performs wireless communication with the communication module via the communication module, display a running screen of an application associated with the augmented reality image on the display, determine whether an object associated with input information input to the electronic device is included in the augmented reality image, and display an additional object on the object based at least in part on the input information. In addition, various embodiments recognized through the specification are possible.

15 Claims, 15 Drawing Sheets

(51) Int. Cl.
  *G06K 9/00* (2006.01)
  *G06T 11/60* (2006.01)
  *G06T 13/40* (2011.01)

(52) U.S. Cl.
  CPC .............. *G06T 11/60* (2013.01); *G06T 13/40* (2013.01); *G02B 2027/014* (2013.01); *G02B 2027/0138* (2013.01); *G09G 2340/12* (2013.01); *G09G 2354/00* (2013.01); *G09G 2370/06* (2013.01)

(56) References Cited

U.S. PATENT DOCUMENTS

| | | |
|---|---|---|
| 2015/0325050 A1 | 11/2015 | Roh et al. |
| 2018/0036640 A1 | 2/2018 | Drakoln et al. |

FOREIGN PATENT DOCUMENTS

| | | |
|---|---|---|
| KR | 10-2015-0057424 A | 5/2015 |
| KR | 10-2015-0087955 A | 7/2015 |
| KR | 10-2015-0127472 A | 11/2015 |
| KR | 10-2018-0042589 A | 4/2018 |

* cited by examiner

ELECTRONIC DEVICE FOR DISPLAYING ADDITIONAL OBJECT IN AUGMENTED REALITY IMAGE, AND METHOD FOR DRIVING ELECTRONIC DEVICE

CROSS REFERENCE TO RELATED APPLICATIONS

This application is a National Phase Entry of PCT International Application No. PCT/KR2019/009724, which was filed on Aug. 5, 2019, and claims a priority to Korean Patent Application No. 10-2018-0105100, which was filed on Sep. 4, 2018, the contents of which are incorporated herein by reference.

TECHNICAL FIELD

Embodiments disclosed in the disclosure relate to technologies of displaying an additional object such as an emoji on an object included in an augmented reality image obtained by an electronic device.

BACKGROUND ART

Electronic devices, each of which has a display, have come into wide use. The electronic device may display a screen obtained by the electronic device using the display. Alternatively, when running an application, the electronic device may display a running screen on the display.

One or more objects may be included in a screen. The electronic device may display an additional object on the object. For example, the electronic device may display an emoji having a facial expression shape on the object.

DISCLOSURE

Technical Problem

An electronic device may obtain an augmented reality image representing a real environment from an augmented reality device. The augmented reality image may include one or more objects. The electronic device may display a specified additional object on any object. However, the electronic device may not recognize whether any of objects is an object meaningful to a user. Thus, there is a problem in which an insufficient additional object is displayed on the object meaningful to the user or in which an unnecessary additional object is displayed on an object meaningless to the user.

Furthermore, the electronic device may not determine whether to display any of a positive emotion or a negative emotion when displaying the additional object on the object. Thus, there is a problem in which, because it is able to display only a specified additional object, it is unable to provide the user with an emotional expression according to the object using the additional object.

Technical Solution

In accordance with an aspect of the disclosure, an electronic device is provided. The electronic device may include a communication module, a display, and at least one processor operatively connected with the communication module and the display. The at least one processor may be configured to receive an augmented reality image from at least one external device performing wireless communication with the communication module via the communication module, display a running screen of an application associated with the augmented reality image on the display, determine whether an object associated with input information input to the electronic device is included in the augmented reality image, and display an additional object on the object based at least in part on the input information.

In accordance with another aspect of the disclosure, an electronic device is provided. The electronic device may include a communication module, a display, a memory, and at least one processor operatively connected with the communication module, the display, and the memory. The at least one processor may be configured to receive an augmented reality image from at least one external device performing wireless communication with the communication module via the communication module, display a running screen of an application associated with the augmented reality image on the display, determine whether an object associated with stored information stored in the memory is included in the augmented reality image, and display an additional object on the object based at least in part on the stored information.

In accordance with another aspect of the disclosure, a driving method of an electronic device is provided. The driving method may include receiving an augmented reality image from at least one external device performing wireless communication with the electronic device, displaying a running screen of an application associated with the augmented reality image on a display, determining whether an object associated with at least one of first information input by a user and second information stored in a memory is included in the augmented reality image, and generating at least one of a first additional object based on the first information and a second additional object based on the second information on the object.

Advantageous Effects

According to embodiments disclosed in the disclosure, an object meaningful to the user may be accurately recognized and an additional object desired by the user may be displayed on the meaningful object.

Furthermore, according to embodiments disclosed in the disclosure, an emotional expression such as a positive or negative emotion may be provided to the user according to a type or a state of the object.

In addition, various effects ascertained directly or indirectly through the disclosure may be provided.

With regard to description of drawings, the same or similar denotations may be used for the same or similar components.

MODE FOR INVENTION

Hereinafter, various embodiments of the disclosure may be described with reference to accompanying drawings. However, it should be understood that this is not intended to limit the present disclosure to specific implementation forms and includes various modifications, equivalents, and/or alternatives of embodiments of the present disclosure.

Figure 1:
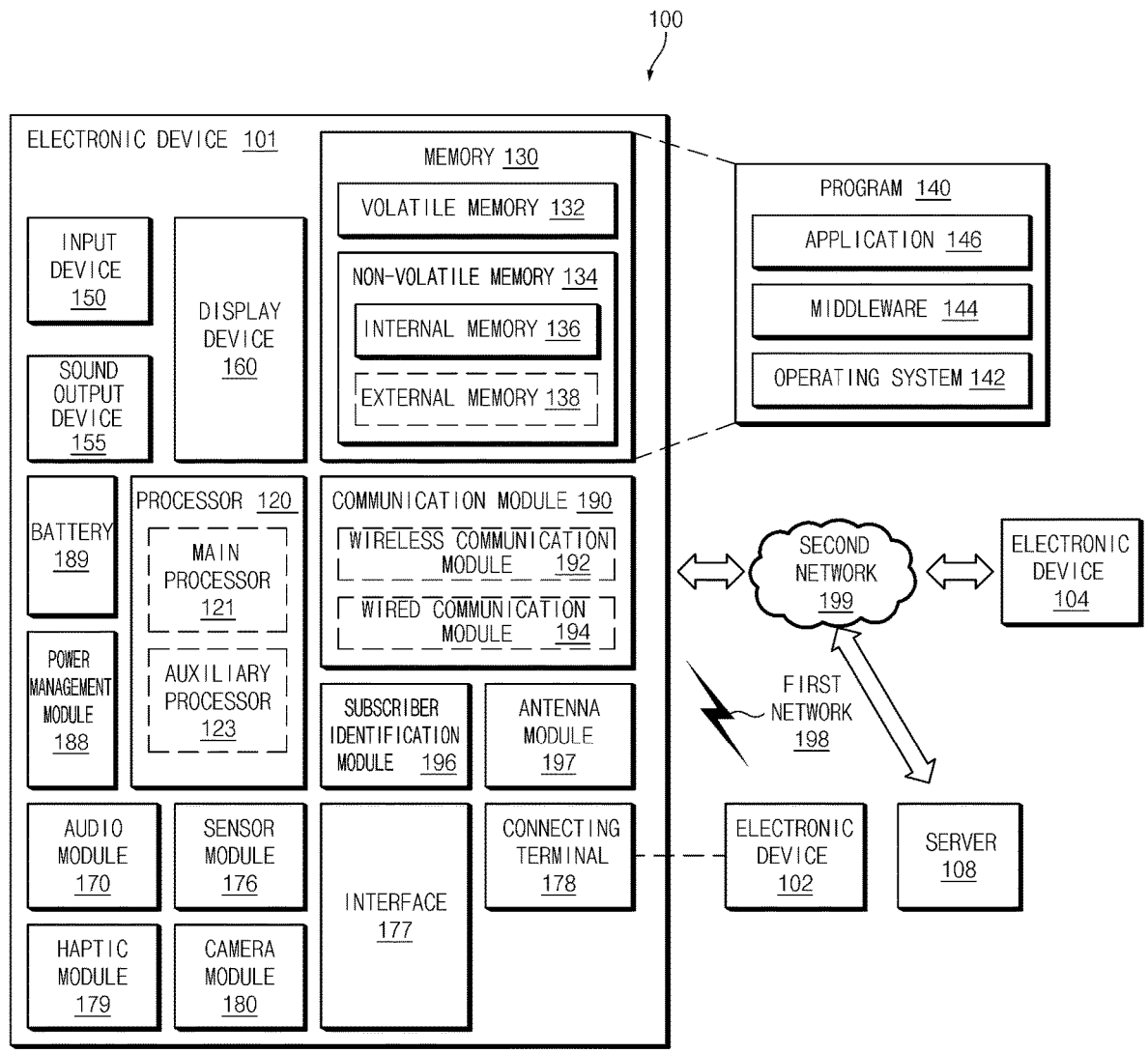
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
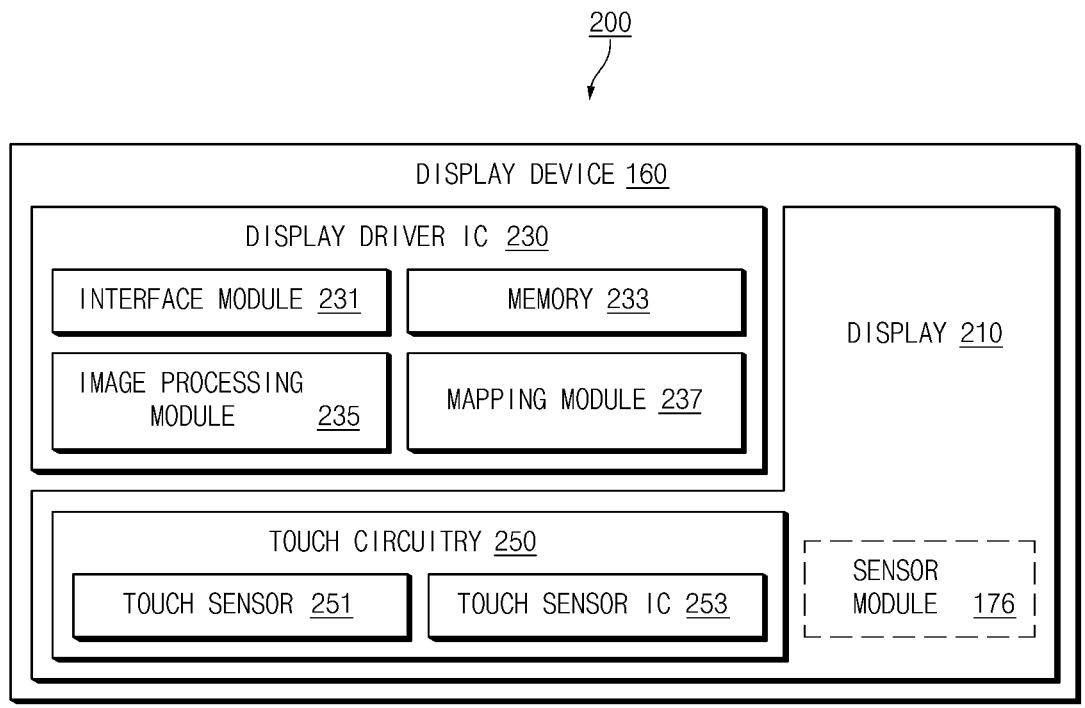
FIG. 2 is a block diagram illustrating the display device according to various embodiments.

FIG. 2 is a block diagram 200 illustrating the display device 160 according to various embodiments. Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
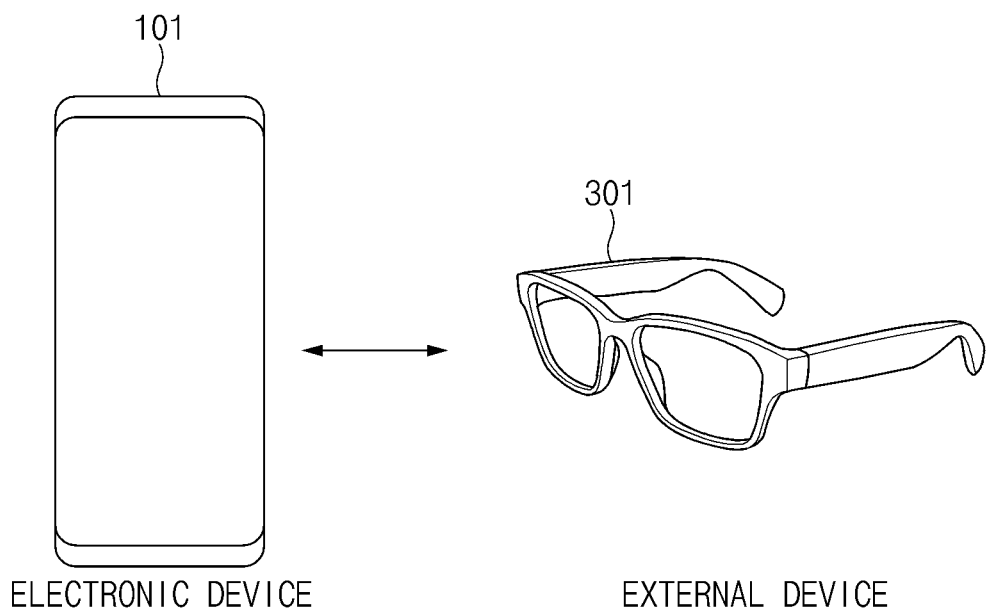
FIG. 3 is a drawing illustrating an electronic device and an external device according to an embodiment.

FIG. 3 is a drawing illustrating an electronic device 101 and an external device 301 according to an embodiment. The external device 301 may be an electronic device which displays an image or generates image data and performs wireless communication with the electronic device 101. For example, the external device 301 may be an augmented reality device such as a wearable device or a smart glass. It is illustratively shown that the external device 301 is the smart glass in FIG. 3, but not limited thereto. Furthermore, FIG. 3 illustrates only the one external device 301, but not limited thereto, and the electronic device 101 may perform wireless communication with the one or more external devices 301.

In an embodiment, the electronic device 101 may obtain an image from the outside using a communication module 190. For example, when the external device 301 is the augmented reality device, the electronic device 101 may obtain an augmented reality image from the external device 301. A processor 120 of the electronic device 101 may analyze the obtained image. The processor 120 may modify the obtained image based at least in part on information input to an input device 150 of the electronic device 101 or information stored in a memory 130. The processor 120 may display the modified image on a display 210 using a display device 160.

In an embodiment, the electronic device 101 may obtain image data from the outside using the communication module 190. For example, the electronic device 101 may obtain augmented reality image data from the external device 301. The processor 120 of the electronic device 101 may analyze the obtained image.

In an embodiment, the external device 301 may generate image data. For example, when the external device 301 is the augmented reality device, the external device 301 may generate an augmented reality image in which an object actually visible to a wearer of the external device 301 and additional information are combined with each other. The external device 301 may display the augmented reality image to the wearer of the external device 301 and may convert the augmented reality image into image data. For another example, the external device 301 may obtain a real screen using a separate input device such as a camera and may convert the real screen into image data.

In an embodiment, the external device 301 may output image data displaying the augmented reality image. The external device 301 may obtain information about at least one object included in the augmented reality image. The external device 301 may transmit information about at least one object to the electronic device 101.

In an embodiment, the processor 120 of the electronic device 101 may modify the obtained image based at least in part on input information input to the input device 150 of the electronic device 101 or stored information stored in the memory 130. The processor 120 may modify data about at least one object included in image data based at least in part on the input information or the stored information. For example, the processor 120 may reflect contents of the input information or the stored information in the image data to add an additional object such as emoji to the augmented reality image.

In an embodiment, the communication module 190 of the electronic device 101 may transmit the modified image data to the external device 301. The external device 301 may display the augmented reality image corresponding to the modified image data such that a user views the at least partially modified augmented reality image. For example, the external device 301 may display an additional object such as emoji on the augmented reality image using the image data.

Figure 4:
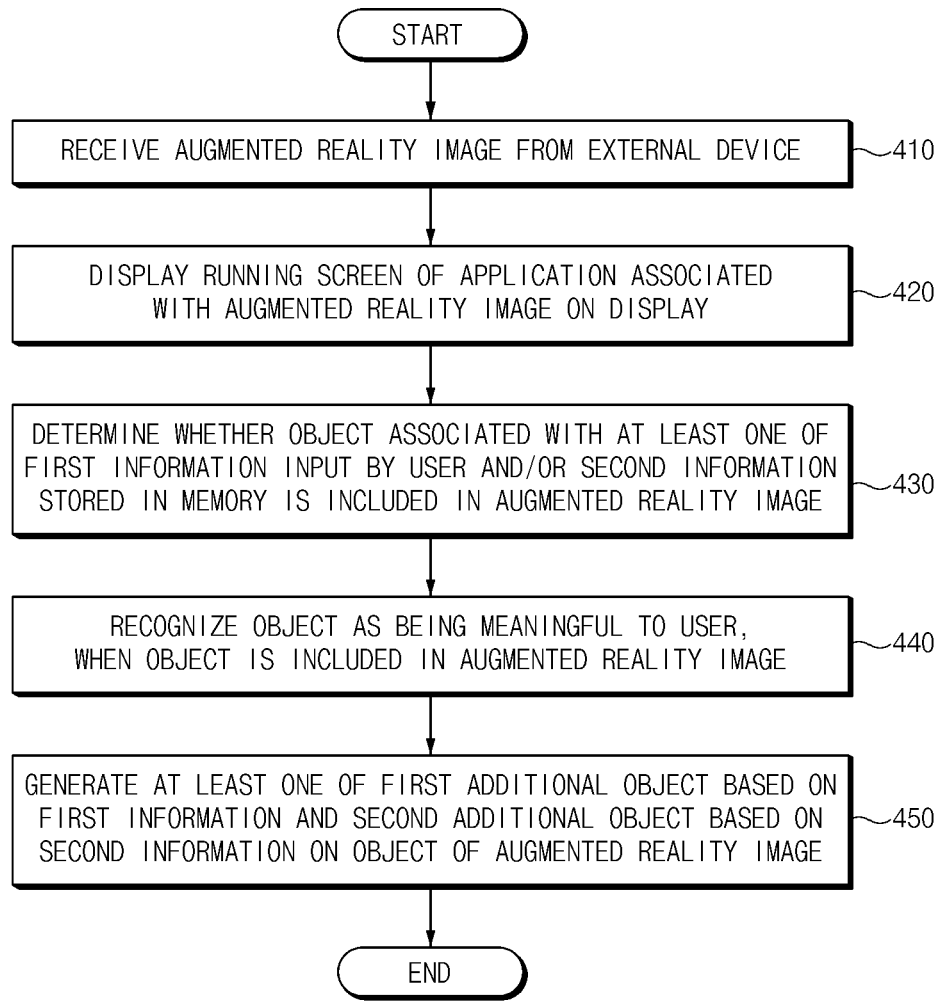
FIG. 4 is a flowchart illustrating a driving method of an electronic device according to an embodiment.

FIG. 4 is a flowchart illustrating a driving method of an electronic device 101 according to an embodiment.

In operation 410, the electronic device 101 according to an embodiment may receive an augmented reality image from an external device (e.g., external device 301 of FIG. 3). For example, the electronic device 101 may receive image data corresponding to the entire augmented reality image from the external device 301. For another example, the electronic device 101 may receive data associated with at least one object included in an augmented reality image from the external device 301. The data associated with the object may include information about a type of the object, a shape of the object, and a relationship between the object and a user.

In operation 420, the electronic device 101 according to an embodiment may display a running screen of an application associated with the augmented reality image on a display 210. The electronic device 101 may run an application corresponding to the obtained augmented reality image or an object included in the obtained augmented reality image. For example, when the augmented reality image has contents associated with health of the user of the electronic device 101 or includes food or exercise equipment which is an object associated with the health of the user, the electronic device 101 may run a health-related application (e.g., Samsung Health™). For another example, when the augmented reality image is an image associated with a thing, the electronic device 101 may run a payment-related application (e.g., Samsung Pay™). The electronic device 101 may display a running screen of the run application on the display 210.

In operation 430, the electronic device 101 according to an embodiment may determine whether an object associated with at least one of first information input by the user and/or second information stored in a memory 130 is included in the augmented reality image. The electronic device 101 may identify a plurality of objects included in the augmented reality image. The electronic device 101 may determine whether each of the plurality of objects is associated with at least one of the first information and/or the second information. In the disclosure, the first information may be referred to as input information and the second information may be referred to as stored information.

In an embodiment, the first information may be information set directly by the user. The electronic device 101 may determine whether an object associated with the information set directly by the user is included. For example, when the user inputs information associated with health to an input device 150 of the electronic device 101 using a touch or a voice, the electronic device 101 may determine whether food or exercise equipment which is an object associated with the health of the user is included in an augmented reality image.

In an embodiment, the second information may be usage pattern data in which usage patterns of the user are accumulated. The electronic device 101 may determine whether an object associated with the usage pattern data is included. For example, when a frequency of search of a keyword associated with health is high in information search records of the user, which is stored in the memory 130 of the electronic device 101, the electronic device 101 may determine whether food or exercise equipment which is an object associated with the health of the user is included in the augmented reality image.

When the object is included in the augmented reality image, in operation 440, the electronic device 101 according to an embodiment may recognize the object as being meaningful to the user. A processor 120 of the electronic device 101 may be configured to, when the object associated with at least one of the first information and/or the second information is included in the augmented reality image, recognize the object as being meaningful to the user and allow the external device 301 to recognize the object. The external device 301 may perform wireless communication with the electronic device 101 and may recognize the object associated with at least one of the first information and/or the second information on the augmented reality image.

In operation 450, the electronic device 101 according to an embodiment may generate at least one of a first additional object based on the first information and a second additional object based on the second information on the object of the augmented reality image. For example, the electronic device 101 may generate an emoji representing the first information or the second information as a facial expression by reflecting contents of the first information or the second information.

In an embodiment, the electronic device 101 may combine additional object data capable of generating and displaying an additional object with image data. The electronic device 101 may transmit the image data with which the additional object data is combined to the external device 301. The external device 301 may view an image in which the additional object is combined with the original augmented reality image using the image data with which the additional object data is combined.

Figure 5:
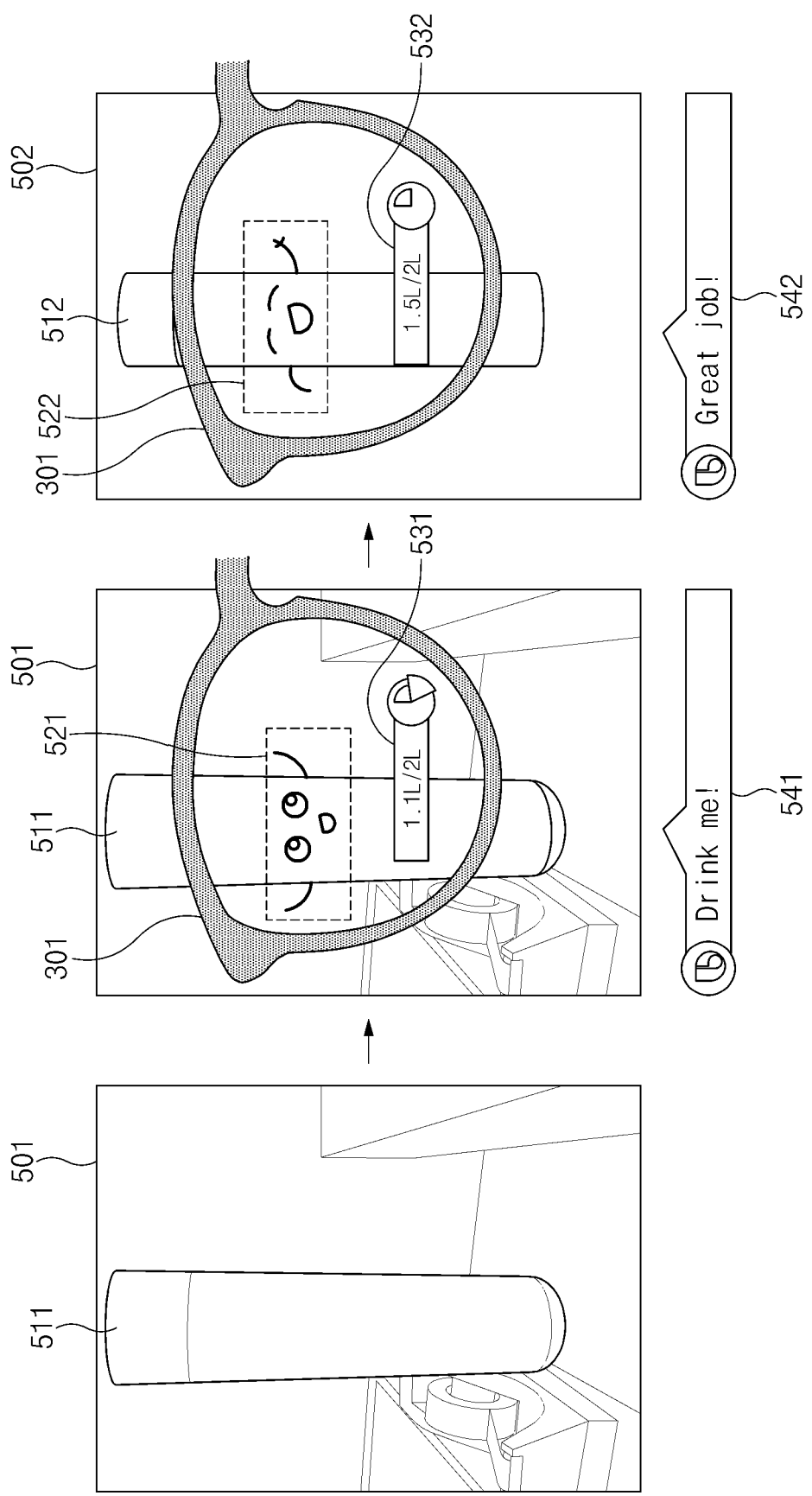
FIG. 5 is a drawing illustrating that an electronic device is configured to display an additional object on an object recognized by an external device according to an embodiment.

FIG. 5 is a drawing illustrating that an electronic device 101 is configured to display an additional object 521 on an object 511 recognized by an external device 301 according to an embodiment.

In an embodiment, reality 501 may include at least one object 511. The electronic device 101 may store information associated with the at least one object 511. For example, the electronic device 101 may store information associated with a type of the at least one object 511, a shape of the at least one object 511, or a priority of a user for the at least on object 511.

In an embodiment, when the reality 501 is viewed through the external device 301, the external device 301 may display an augmented reality image in which an additional object 521 is generated on the at least one object 511 included in the reality 501. A processor 120 of the electronic device 101 may be configured to display the additional object 521 on the at least one object 511.

In an embodiment, the additional object 521 may be an emoji representing a facial expression on the object 511 by at least partially reflecting first information input to the electronic device 101 or second information stored in the electronic device 101. The additional object 521 may display a meaning the object 511 has to the user using the first information or the second information. The additional object 521 may be implemented as a positive facial expression or a negative facial expression according to the meaning the object 511 has to the user. The additional object 521 may emotionally convey the meaning the object 511 has to the user depending on the first information or the second information.

In an embodiment, the user may input recommended daily intake of water and Today's water intake to the electronic device 101. The processor 120 of the electronic device 101 may be configured to allow a health-related object to have a high priority in the external device 301 and may be configured to recognize the health-related object in an augmented reality image. For another example, a memory 130 of the electronic device 101 may store information about the recommended daily intake of water and records where the user performs a search associated with water intake.

In an embodiment, when the reality 501 is seen and water in a bottle is visible using the external device 301, the electronic device 101 may recognize water in the bottle as the object 511 meaningful to the user and may generate additional object data capable of generating the additional object 521, thus transmitting the additional object data to the external device 301. The external device 301 may display an emoji representing a positively recommending emotion to be at least partially overlapped with the bottle to recommend the user who views an augmented reality image to drink fluid using additional object data.

In an embodiment, the processor 120 of the electronic device 101 may be configured such that at least one or more of the electronic device 101 or the external device 301 provide visual guidance 531 associated with the additional object 521. For example, the external device 301 may generate text information indicating a current numerical value compared to a target numerical value capable of being recognized visually and/or a graph corresponding to the text information. The external device 301 may display the visual guidance 531 to be at least partially overlapped on the at least one object 511. The user may accurately recognize an intention the additional object 521 wants to express or a degree of an action the additional object 521 wants to recommend, by means of the visual guidance 531. For example, when the object 511 is water in the bottle, the external device 301 may receive recommended daily intake of water and Today's water intake of the user from the electronic device 101. The external device 301 may display the Today's water intake compared to the recommended daily intake of water in the form of text information and a circular graph corresponding to the text information.

In an embodiment, the processor 120 of the electronic device 101 may be configured such that at least one or more of the electronic device 101 or the external device 301 provide voice guidance 541 associated with the additional object 521. For example, when the object 511 is water in the bottle, the electronic device 101 or the external device 301 may output the voice "Drink me!" 541 using a voice utterance application (e.g., Bixby™).

In an embodiment, when there is a change in external environments of at least one or more of the electronic device 101 or the external device 301, the processor 120 of the electronic device 101 may change a shape of the additional object 522 in response to the changed situation. For example, when a change occurs in the reality 502 or the object 512, the processor 120 of the electronic device 101 may modify additional object data by reflecting the changed situation. For example, when the object 512 is a bottle after drinking up all the water, the processor 120 of the electronic device 101 may generate an additional object 522 by reflecting a situation where Today's water intake increases as much as the volume of water of the bottle and may transmit the additional object 522 to the external device 301. The external device 301 may display an emoji representing a positive, satisfying emotion to be at least partially overlapped with the bottle to convey the meaning that water intake is desirable to the user.

In an embodiment, the processor 120 of the electronic device 101 may be configured to, when there is a change in external environments of at least one or more of the electronic device 101 or the external device 301, provide visual guidance 532 in response to the changed situation. For example, when the object 512 is the bottle after drinking up all the water, the processor 120 of the electronic device 101 may transmit data where Today's water intake increases as much as the volume of water of the bottle to the external device 301. The external device 301 may increase and display Today's water intake of the user as much as the volume of water of the bottle.

In an embodiment, the processor 120 of the electronic device 101 may be configured to, when there is a change in external environments of at least one or more of the electronic device 101 or the external device 301, provide voice guidance 542 in response to the changed situation. For example, when the object 512 is the bottle after drinking up all the water, the electronic device 101 or the external device 301 may output the voice "Great job!" using the voice utterance application.

Figure 6:
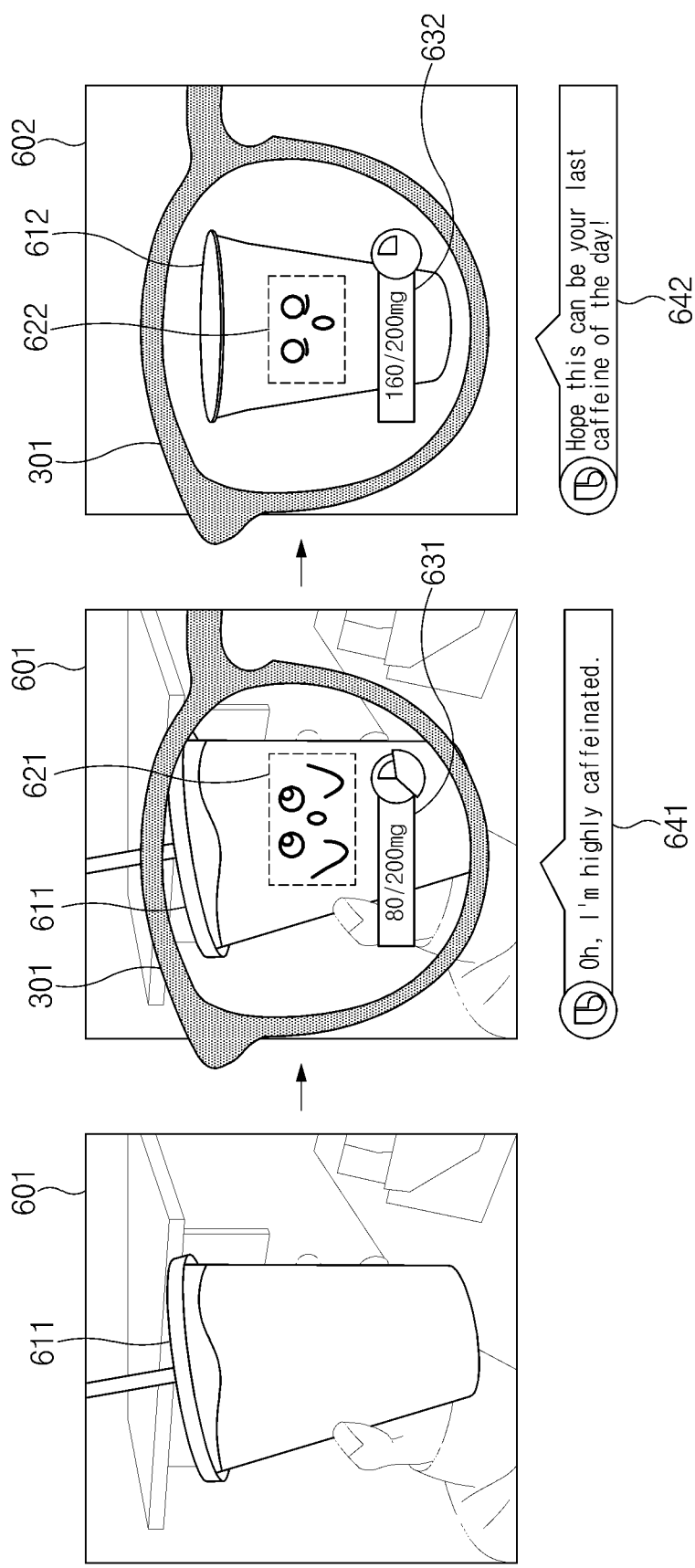
FIG. 6 is a drawing illustrating that an electronic device is configured to display an additional object on an object recognized by an external device according to another embodiment.

FIG. 6 is a drawing illustrating that an electronic device 101 is configured to display an additional object 621 on an object 611 recognized by an external device 301 according to an embodiment.

In an embodiment, reality 601 may include at least one object 611. The electronic device 101 may determine whether the at least one object 611 is an object meaningful to a user based on input information input directly by the user or stored information stored in the memory 130.

In an embodiment, when the reality 601 is viewed through the external device 301, the external device 301 may display an augmented reality image in which the additional object 621 is generated on the at least one object 611 included in the reality 601. The additional object 621 may represent a facial expression on the object 611 by at least partially reflecting first information input to the electronic device 101 or second information stored in the electronic device 101. The additional object 621 may emotionally convey a meaning the object 611 has to the user depending on the first information or the second information.

In an embodiment, the user may input allowable daily intake of caffeine and Today's caffeine intake to the electronic device 101. A processor 120 of the electronic device 101 may be configured to allow a health-related object to have a high priority in the external device 301 and may be configured to recognize the health-related object in an augmented reality image. For another example, a memory 130 of the electronic device 101 may store information about the allowable daily intake of caffeine and records where the user performs a search associated with caffeine intake.

In an embodiment, when the reality 601 is seen and water in a caffeine drink is visible using the external device 301, the electronic device 101 may recognize the caffeine drink as the object 611 meaningful to the user and may generate additional object data capable of generating the additional object 621, thus transmitting the additional object data to the external device 301. The external device 301 may display an emoji representing a worrying emotion to be at least partially overlapped with the caffeine drink to warn the user who views an augmented reality image about excessive caffeine intake using additional object data.

In an embodiment, the processor 120 of the electronic device 101 may be configured such that at least one or more of the electronic device 101 or the external device 301 provide visual guidance 631 associated with the additional object 621. For example, when the object 611 is the caffeine drink, the external device 301 may receive allowable daily intake of caffeine and Today's caffeine intake of the user from the electronic device 101. The external device 301 may display Today's caffeine intake compared to allowable daily intake of caffeine of the user in the form of text information and a circular graph corresponding to the text information.

In an embodiment, the processor 120 of the electronic device 101 may be configured such that at least one or more of the electronic device 101 or the external device 301 provide voice guidance 641 associated with the additional object 621. For example, when the object 611 is the caffeine drink, the electronic device 101 or the external device 301 may output the voice "Oh, I'm highly caffeinated." 641 using a voice utterance application.

In an embodiment, when there is a change in external environments of at least one or more of the electronic device 101 or the external device 301, the processor 120 of the electronic device 101 may change a shape of the additional object 622 in response to the changed situation. For example, when a change occurs in the reality 602 or the object 612, the processor 120 of the electronic device 101 may modify additional object data by reflecting the changed situation. For example, when the object 612 is a cup after drinking up all the caffeine, the processor 120 of the electronic device 101 may generate an additional object 622 by reflecting a situation where Today's caffeine intake increases as much as the amount of caffeine contained in the caffeine drink and may transmit the additional object 622 to the external device 301. The external device 301 may display an emoji representing a negative, more worrying emotion to be at least partially overlapped with the cup to convey the meaning of refraining from drinking further caffeine to the user.

In an embodiment, the processor 120 of the electronic device 101 may be configured to, when there is a change in external environments of at least one or more of the electronic device 101 or the external device 301, provide visual guidance 632 in response to the changed situation. For example, when the object 612 is the cup after drinking up all the caffeine drink, the processor 120 of the electronic device 101 may transmit data where Today's caffeine intake increases as much as the amount of caffeine contained in the caffeine drink to the external device 301. The external device 301 may increase and display Today's caffeine intake as much as the amount of caffeine contained in the caffeine drink.

In an embodiment, the processor 120 of the electronic device 101 may be configured to, when there is a change in external environments of at least one or more of the electronic device 101 or the external device 301, provide voice guidance 642 in response to the changed situation. For example, when the object 612 is the cup after drinking up all the caffeine drink, the electronic device 101 or the external device 301 may output the voice "Hope this can be your last caffeine of the day!" using the voice utterance application.

Figure 7:
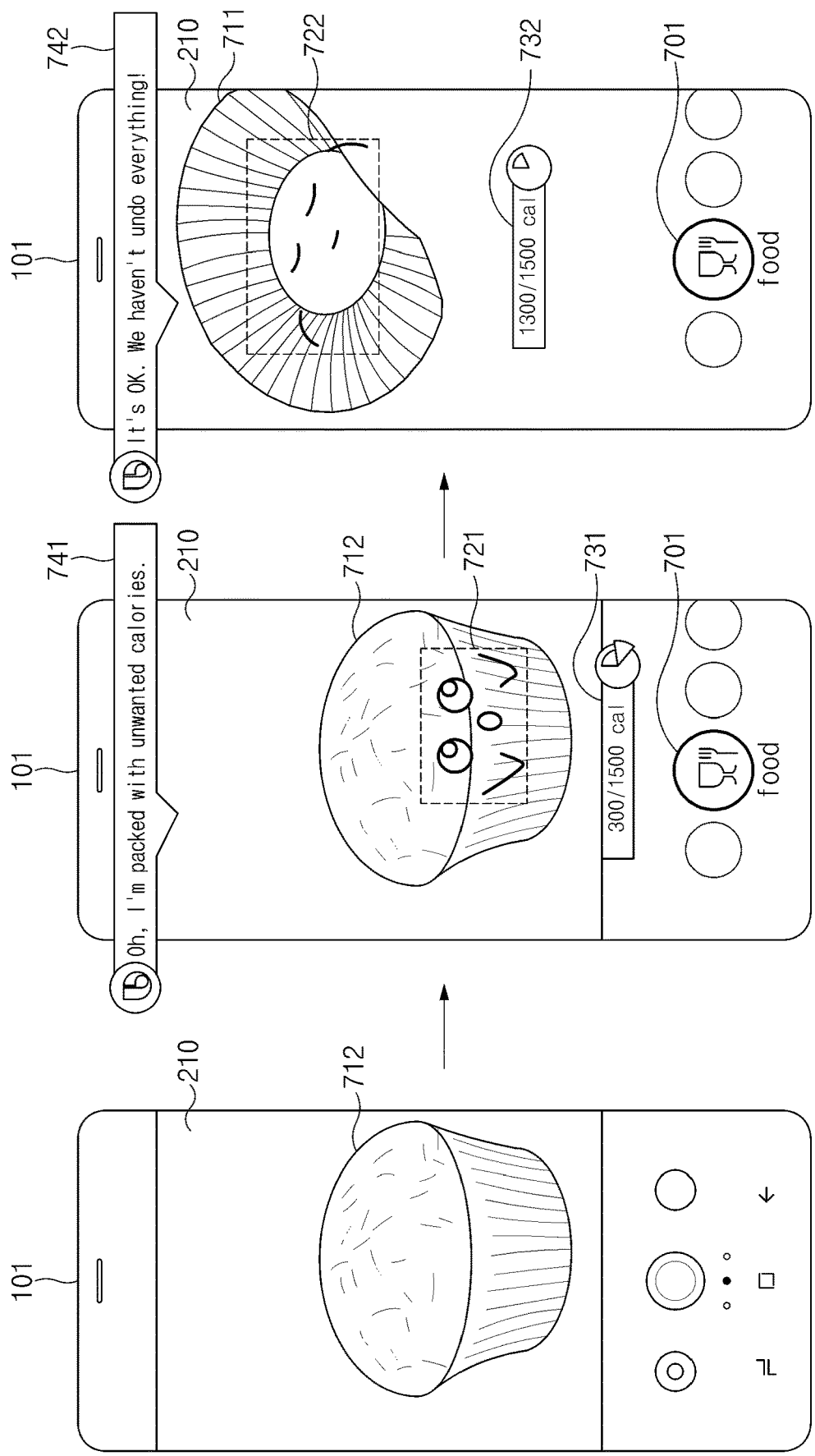
FIG. 7 is a drawing illustrating displaying an additional object on a recognized object in an electronic device according to an embodiment.

FIG. 7 is a drawing illustrating displaying an additional object 721 on a recognized object 711 in an electronic device 101 according to an embodiment.

In an embodiment, the electronic device 101 may obtain an image including an object 712 using a camera included in a camera module 180. The electronic device 101 may display the obtained image on a display 210. The electronic device 101 may obtain information associated with the object 712. For example, when the object 712 is food, a processor 120 of the electronic device 101 may obtain calorie information of the object 712.

In an embodiment, the electronic device 101 may determine whether the object 712 is meaningful to a user based at least in part on information input directly by the user or information according to a situation outside the electronic device 101. For example, when the user inputs calories of food or diet to an input device 150, the electronic device 101 may determine that the object 712 corresponding to food is meaningful to the user. For another example, when the user recently and frequently search for information about calories of food or diet or selects the information about the calories of food or the diet in a high priority, the electronic device 101 may determine that the object 712 corresponding to food is meaningful to the user.

In an embodiment, the electronic device 101 may determine whether the object 712 is meaningful to a user based at least in part on usage pattern data in which usage patterns of the user are accumulated. For example, the electronic device 101 may accumulate and store a pattern where the user recently and frequently search for information about calories of food or diet or selects the information about the calories of food or the diet in a high priority in a memory 130. When the electronic device 101 views the object 712, the processor 120 of the electronic device 101 may determine that the object 712 corresponding to the food is meaningful to the user, with reference to usage pattern data stored in the memory 130.

In an embodiment, the electronic device 101 may run an application 701 associated with the object 712. For example, when the object 712 is food, the electronic device 101 may run the food application 701 associated with a type of the food or calories of the food. When the user selects the meaningful object 712, the application 701 may be executed according to an input of the user. Alternatively, as the electronic device 101 recognizes the object 712 based on stored information stored in the memory 130, the processor 120 of the electronic device 101 may automatically run the application 701.

In an embodiment, the processor 120 of the electronic device 101 may display the additional object 721 on the object 712, based on information input by the user or information stored in the memory 130. The processor 120 may determine whether the object 712 has any of a positive meaning or a negative meaning to the user, based on information input by the user or information stored in the memory 130. The processor 120 may display the additional object 721 representing an emotion associated with the object 712 by reflecting a meaning the object 712 has to the user. For example, when the object 712 is a cake, the processor 120 may measure calories of the cake using the food application 701. When the user inputs calorie related information to the electronic device 101 or when calorie-related search records are stored in the memory 130, the processor 120 may generate the additional object 721 for representing an emotion worrying because the calories of the cake are high. A display 210 of the electronic device 101 may display an image displaying the additional object 721 on the object 712.

In an embodiment, the processor 120 of the electronic device 101 may be configured such that at least one or more of the electronic device 101 or the external device 301 provide visual guidance 731 associated with the additional object 721. For example, when the object 712 is the cake, the processor 120 may load recommended daily calorie intake and Today's calorie intake of the user from the memory 130. The display 210 may display Today's calorie intake compared to recommended daily calorie intake of the user in the form of text information and a circular graph corresponding to the text information.

In an embodiment, the electronic device 101 may provide voice guidance 741 associated with the additional object 721. For example, when the object 712 is the cake, the electronic device 101 may output the voice "Oh, I'm packed with unwanted calories." 741 using a voice utterance application.

In an embodiment, when there is a change in an external environment of the electronic device 101, the processor 120 of the electronic device 101 may change a shape of the additional object 722 in response to the changed situation. For example, when a change occurs in a state of the object 711, the processor 120 of the electronic device 101 may modify additional object data by reflecting the changed state of the object 711. For example, when the object 711 is a wrapper after eating the cake, the processor 120 of the electronic device 101 may generate an additional object 722 by reflecting a situation where Today's calorie intake increases as much as calories contained in the cake. The electronic device 101 may display an emoji representing a positive emotion of eating food and feeling full and satisfied to be at least partially overlapped with the wrapper of the cake to convey the meaning that you may rest assured because calories the user drinks up to now are less than the recommended daily calorie intake to the user.

In an embodiment, the processor 120 of the electronic device 101 may be configured to, when there is a change in an external environment of the electronic device 101, provide visual guidance 732 in response to the changed situation. For example, when the object 711 is the wrapper after eating the cake, the processor 120 of the electronic device 101 may generate data where Today's calorie intake increases as much as calories contained in the cake. The display 210 may increase and display Today's calorie intake as much as calories contained in the cake.

In an embodiment, the processor 120 of the electronic device 101 may be configured to, when there is a change in an external environment of the electronic device 101, provide voice guidance 742 in response to the changed situation. For example, when the object 711 is the wrapper after eating the cake, the electronic device 101 may output the voice "It's OK. We haven't undo everything!" using the voice utterance application.

Figure 8:
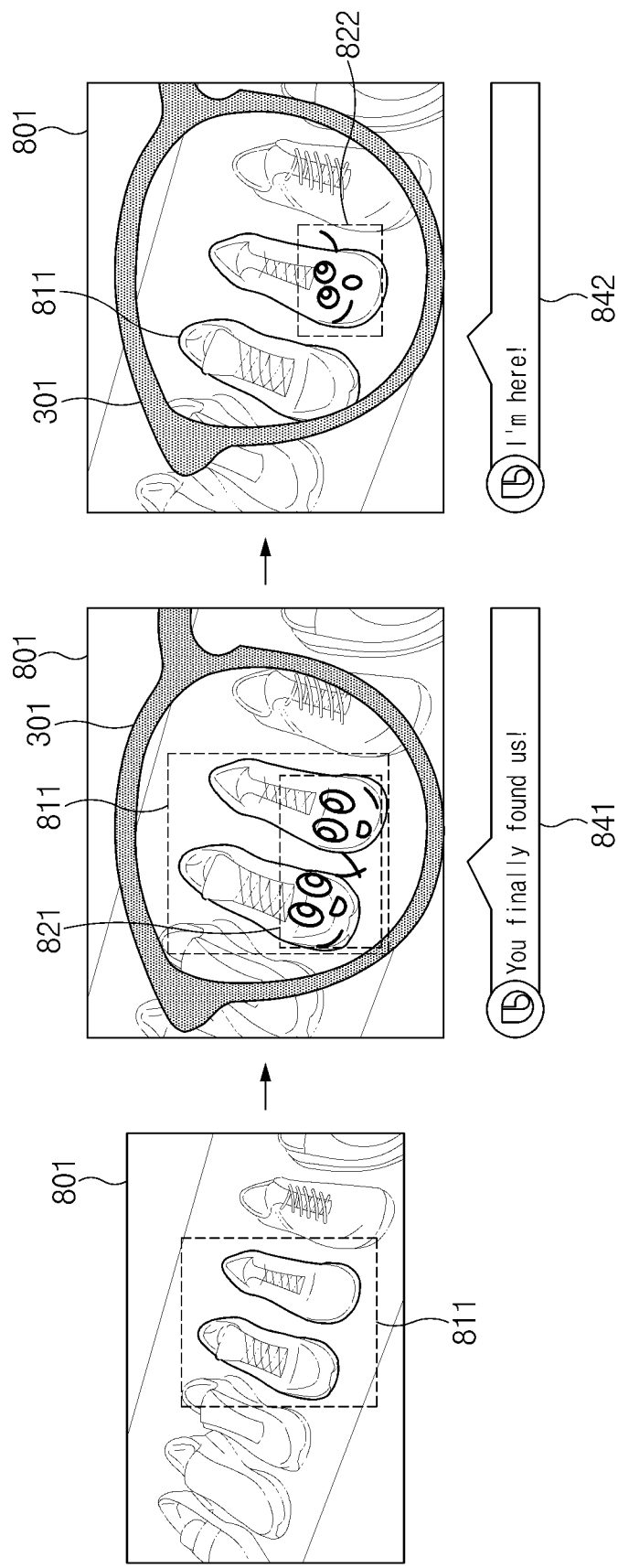
FIG. 8 is a drawing illustrating that an electronic device is configured to display an additional object on an augmented reality image in response to movement of an external device according to an embodiment.

FIG. 8 is a drawing illustrating that an electronic device 101 is configured to display additional objects 821 and 822 on an augmented reality image in response to movement of an external device 301 according to an embodiment.

In an embodiment, a user may view reality using the external device 301. The external device 301 may display an augmented reality image 801 based on the reality. The external device 301 may recognize an object 811 on the augmented reality image 801. The external device 301 may determine whether the object 811 is meaningful to the user based on input information provided from the electronic device 101 or stored information. For example, when the object 811 is shoes, the external device 301 may determine that the object 811 is meaningful to the user based on information input about the shoes by the user, which is provided from the electronic device 101, and information storing a search history associated with the shoes.

In an embodiment, the external device 301 may determine whether the object 811 has a positive emotion or a negative emotion to the user based on input information provided from the electronic device 101 and stored information. The external device 301 may analyze and personify an emotion the user has to the object 811 in the input information provided from the electronic device 101 or the stored information to generate and display the additional object 821. For example, when the object 811 is the same shoes as shoes stored in a memory 130 of the electronic device 101, the external device 301 may determine that the user wants to use the object 811. The external device 301 may generate the additional object 821 such that the object 811 also represents an emotion welcoming the user as a facial expression. The external device 301 may display the additional object 821 to be at least partially overlapped with the object 811.

In an embodiment, the external device 301 may provide voice guidance 841 associated with the additional object 821. For example, when the object 811 is shoes the user frequently searches for, the external device 301 may output the voice "You finally found us!" 841 using a voice utterance application.

In an embodiment, the external device 301 and an augmented reality image 801 displayed by the external device 301 may be moved along movement of the user. When the augmented reality image 801 is moved, a state of the object 811 displayed on the augmented reality image 801 may be changed. For example, when the augmented reality image 801 changes its display location to display a location where the object 811 is not disposed on reality, the object 811 may depart from the augmented reality image 801.

In an embodiment, the external device 301 may change and display the additional object 822 displayed on the object 811 in response to movement of the augmented reality image 801. When the object 811 departs from the augmented reality image 801, the external device 301 may change and display a shape of the additional object 822 with regard to a meaning the user has to the object 811. For example, when the object 811 is shoes the user frequently searches for and when the augmented reality image 801 changes its display location to display a location where the object 811 is not disposed on reality, the external device 301 may determine that the user does not discover and miss the object 811. The external device 301 may change the additional object 822 to represent an emotion causing the user to identify whether the object 811 is missed by any chance as a facial expression on the object 811. The external device 301 may display the additional object 822 to be at least partially overlapped with the object 811.

In an embodiment, the external device 301 may provide voice guidance 842 associated with the additional object 822. For example, when the object 811 is shoes the user frequently searches for and when the augmented reality image 801 changes its display location to display a location where the object 811 is not disposed on reality, the external device 301 may output the voice "I'm here!" 842 using the voice utterance application.

Figure 9A:
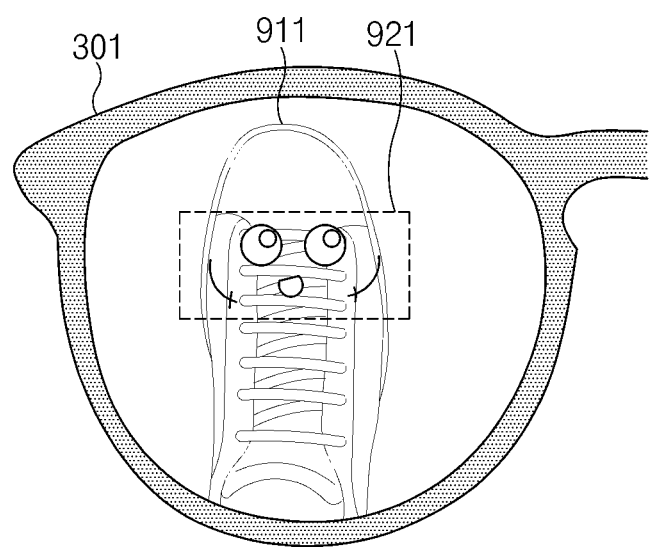
FIGS. 9A and 9B are drawings illustrating recognizing an object using an external device in an electronic device or recognizing an object using the electronic device according to an embodiment.
Figure 9B:
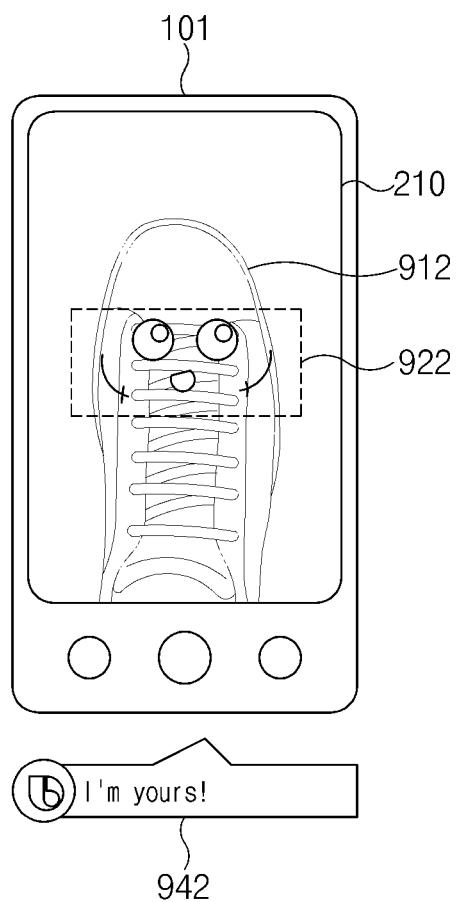

FIGS. 9A and 9B are drawings illustrating recognizing an object 911 using an external device 300 in an electronic device 101 or recognizing an object 912 using the electronic device 101 according to another embodiment.

In an embodiment, as shown in FIG. 9A, the external device 301 may view the object 911. The electronic device 101 may determine whether the object 911 viewed by the external device 301 is meaningful to a user. A processor 120 of the electronic device 101 may determine whether the object 911 is meaningful to the user based on input information input by the user or stored information stored in a memory 130. When it is determined that the object 911 is meaningful to the user, the processor 120 may combine additional object data displaying an additional object 921 on the object 911 with image data. A communication module 190 of the electronic device 101 may transmit the image data with which the additional object data is combined to the external device 301 through wireless communication. The external device 301 may display an augmented reality image indicating the additional object 921 on the object 911 to the user.

For example, the external device 301 may view shoes 911. When the user inputs shoes to an input device 150 of the electronic device 101 or when information associated with shoes is stored in the memory 130 of the electronic device 101, the processor 120 of the electronic device 101 may recognize the shoes 911 as an object meaningful to the user. The processor 120 may determine that the user wants the shoes 911 and may combine emoji data generating a facial expression 921 capable of representing the emotion that it is nice for the user to find it with image data. The external device 301 may display an augmented reality image indicating the facial expression 921 to be at least partially overlapped with the shoes 911 using the image data with which the emoji data is combined.

In an embodiment, the external device 301 may provide voice guidance 941 associated with the additional object 921. For example, when the object 911 is shoes desired by the user, the external device 301 may output the voice "I'm yours!" 941 using a voice utterance application.

In an embodiment, as shown in FIG. 9B, the electronic device 101 may view the object 912 using a camera module 180. The electronic device 101 may determine whether the viewed object 912 is meaningful to the user. The processor 120 of the electronic device 101 may determine whether the object 912 is meaningful to the user based on input information input by the user or stored information stored in the memory 130. When it is determined that the object 912 is meaningful to the user, the processor 120 may combine additional object data displaying an additional object 922 on the object 912 with image data. The electronic device 101 may display an image indicating the additional object 922 on the object 912 to the user.

For example, the electronic device 101 may view the shoes 912. When the user inputs shoes to the input device 150 of the electronic device 101 or when information associated with shoes is stored in the memory 130 of the electronic device 101, the processor 120 of the electronic device 101 may recognize the shoes 912 as an object meaningful to the user. The processor 120 may determine that the user wants the shoes 912 and may combine emoji data generating the facial expression 922 capable of representing the emotion that it is nice for the user to find it with image data. The electronic device 101 may display an image indicating the facial expression 922 to be at least partially overlapped with the shoes 912 on a display 210 using the image data with which the emoji data is combined.

In an embodiment, the electronic device 101 may provide voice guidance 942 associated with the additional object 922. For example, when the object 912 is shoes desired by the user, the electronic device 101 may output the voice "I'm yours!" 942 using the voice utterance application.

Figure 10:
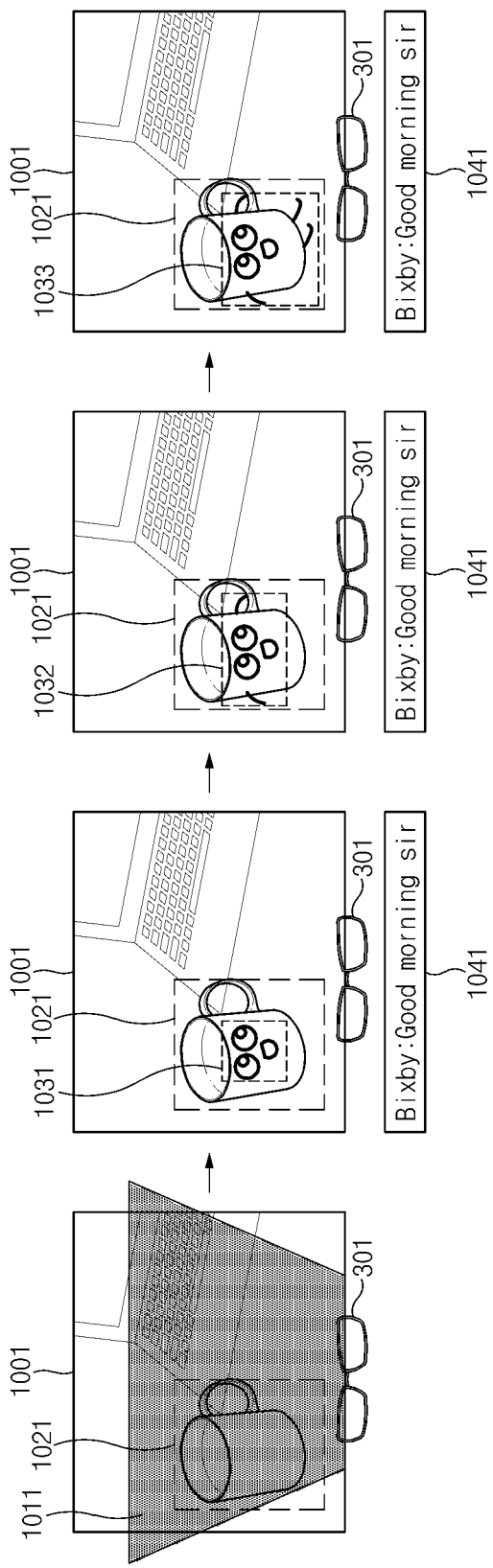
FIG. 10 is a drawing illustrating a process of viewing reality using an external device and generating additional objects in response to a shape of an object in an electronic device according to an embodiment.

FIG. 10 is a drawing illustrating a process of viewing reality 1001 using an external device 301 and generating additional objects 1031, 1032, and 1033 in response to a shape of an object 1021 in an electronic device 101 according to an embodiment.

In an embodiment, the external device 301 may display reality 1001 included in a field of view (FOV) 1011 visible by the external device 301. The external device 301 may recognize the object 1021 on the reality 1001 included in the visible FOV 1011. The external device 301 may determine whether the object 1021 is meaningful to the user based on input information transmitted from the electronic device 101 or stored information. When the object 1021 is meaningful to the user, the external device 301 may transmit information associated with a shape of the object 1021 to the electronic device 101. For example, when the user inputs information associated with a cup to the electronic device 101 or stores the information in a memory 130, the external device 301 may recognize the cup as the object 1021 meaningful to the user.

In an embodiment, a processor 120 of the electronic device 101 may determine whether it is able to display the additional image 1031 on the object 1021, based on the shape of the object 1021. For example, the processor 120 may determine whether it is able to overlay the additional object 1031 on the object 1021 depending on a size of the object 1021, a color of the object 1021, or whether there is a symbol such as a symbol character or pattern on a surface of the object 1021.

In an embodiment, the processor 120 of the electronic device 101 may be configured to, when it is determined that it is able to overlay the additional object 1031 on the object 1021, display a facial expression 1031 based on input information or stored information associated with the object 1021. The processor 120 may transmit image data with which emoji data is combined to the external device 301 such that the external device 301 overlaps and displays the additional object 1031 on the object 1021. For example, when the object 1021 is the cup, the processor 120 may determine that the user finds the cup in the morning based on information about a time when the user uses the cup. The processor 120 may be configured to generate a facial expression where the cup as the additional object 1031 says good morning to the user.

In an embodiment, the processor 120 may be configured such that the electronic device 101 or the external device 301 output a voice corresponding to the additional object 1031 using a voice utterance application (e.g., Bixby™). For example, when generating the facial expression 1031 saying good morning, the electronic device 101 or the external device 301 may output the voice "Good morning sir" 1041 using the voice utterance application.

In an embodiment, the processor 120 may be configured to change a shape of the additional object 1032 in response to the shape of the object 1021. The processor 120 may be configured, when the width of the object 1021 meets a specified range condition, such that the additional object 1032 protrudes from edges of both sides of the object 1021. The external device 301 may display the additional object 1032, the shape of which is changed. For example, when the object 1021 is the cup, the processor 120 may determine whether the width of the cup meets the specified range condition. When the width of the cup meets the specified range condition, the external device 301 may display the additional object 1032 in a form where edges of both sides of the cup have arms under control of the processor 120.

In an embodiment, the processor 120 may change a shape of the additional object 1033 in response to whether an edge of the object 1021 comes into contact with another thing. The external device 301 may display the additional object 1033, the shape of which is changed. For example, the processor 120 may be configured to, when the object 1021 is a cup on the desk, to personify the cup such that the cup sits on the desk. The external device 301 may display the additional object 1033 in the form of a low portion of the cup with legs sitting.

Figure 11A:
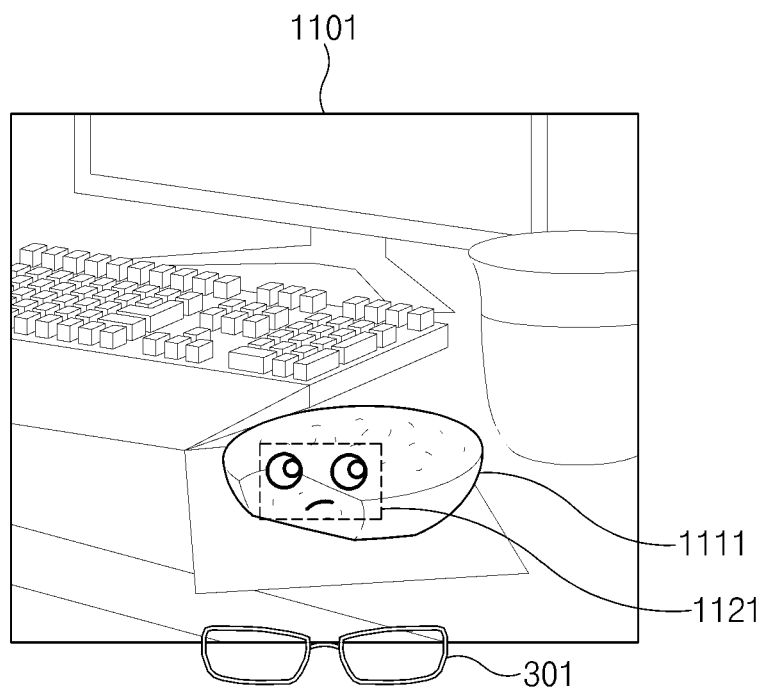
FIGS. 11A to 11C are drawings illustrating displaying additional objects on objects of augmented reality images viewed by an external device based on input information in an electronic device according to an embodiment.
Figure 11A:
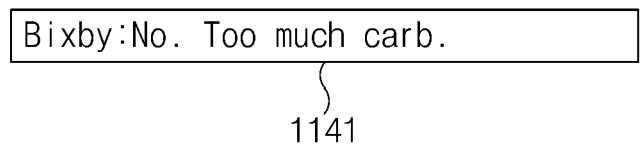
Figure 11B:
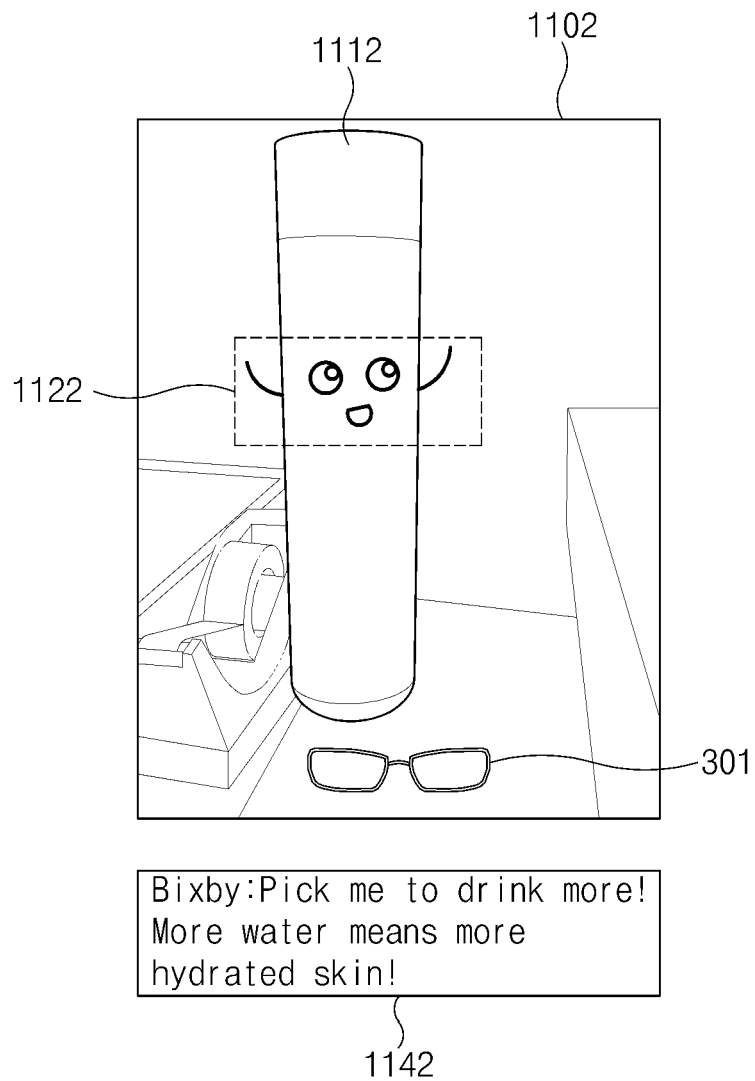
Figure 11C:
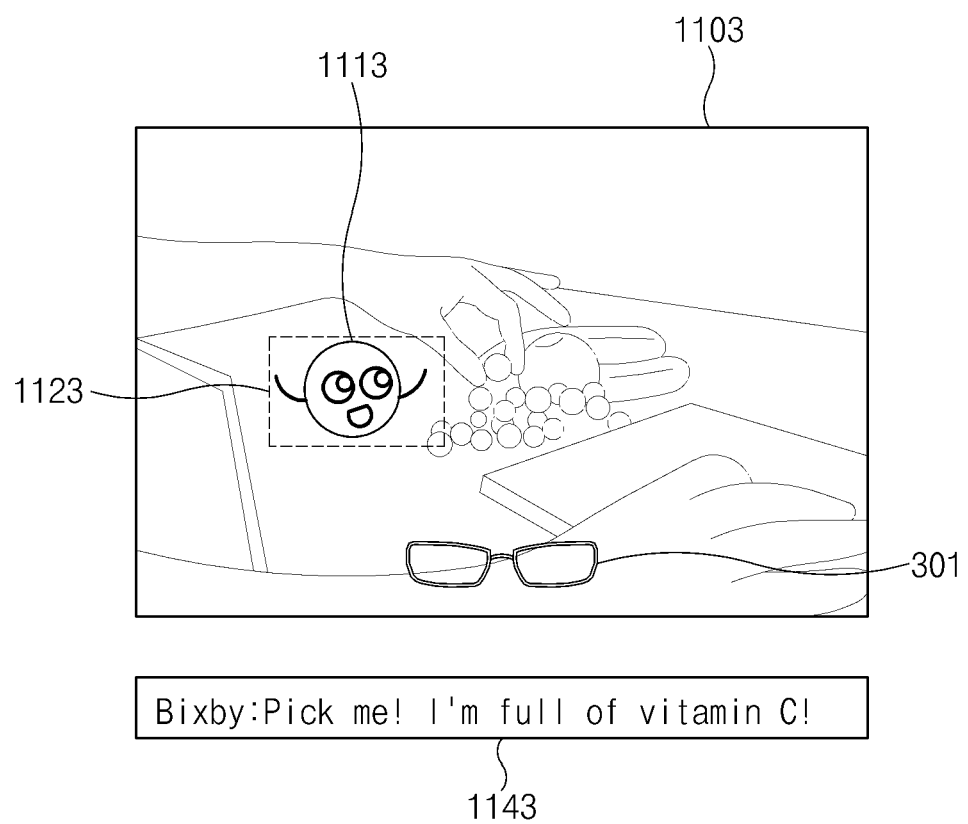

FIGS. 11A to 11C are drawings illustrating displaying additional objects 1121, 1122, and 1123 on objects 1111, 1112, and 1113 of augmented reality images 1101, 1102, and 1103 viewed by an external device 301 based on input information in an electronic device 101 according to an embodiment.

In an embodiment, the electronic device 101 may receive information input directly by a user or information about a situation around the electronic device 101 by means of a sensor module 176 to have input information. The electronic device 101 may receive the augmented reality images 1101, 1102, and 1103 from the external device 301 using a communication module 190. A processor 120 of the electronic device 101 may identify a meaning between a user and the objects 1111, 1112, and 1113 of the augmented reality images 1101, 1102, and 1103 based on the input information. The processor 120 may be configured to display the additional objects 1121, 1122, and 1123 to correspond to the meaning between the user and the objects 1111, 1112, and 1113.

For example, as shown in FIG. 11A, bread, calories of which are greater than or equal to a specified range, may be viewed on the augmented reality image 1101 viewed by the external device 301. When the user inputs calorie-related information to the electronic device 101 or when calorie-related information is set to have a high priority, the electronic device 101 may recognize the bread as the object 1111. The processor 120 of the electronic device 101 may be configured to display a negative facial shape as the additional object 1121 to mean that the break has too many calories. In an embodiment, the external device 301 may display the additional object 1121 on the object 1111 of the augmented reality image 1101.

For another example, as shown in FIG. 11B, a water bottle with water may be viewed on the augmented reality image 1102 viewed by the external device 301. When the user inputs water intake related information to the electronic device 101 or when water intake related information is set to have a high priority, the electronic device 101 may recognize the water bottle with water as the object 1112. The processor 120 of the electronic device 101 may be configured to display a positive facial shape as the additional object 1122 to mean that it is good to drink water. The external device 301 may display the additional object 1122 on the object 1112 of the augmented reality image 1102.

For another example, as shown in FIG. 11C, a fruit may be viewed on the augmented reality image 1103 viewed by the external device 301. When the user inputs vitamin-related information to the electronic device 101 or when vitamin-related information is set to have a high priority, the electronic device 101 may recognize the fruit as the object 1113. The processor 120 of the electronic device 101 may be configured to display a positive facial shape as the additional object 1123 to mean that the fruit is rich in vitamins. The external device 301 may display the additional object 1123 on the object 1113 of the augmented reality image 1103.

In an embodiment, the processor 120 of the electronic device 101 may be configured to output voices 1141, 1142, and 1143 corresponding to contents of the displayed additional objects 1121, 1122, and 1123 by means of the electronic device 101 or the external device 301. For example, in case of FIG. 11A, the processor 120 may output the voice "No. Too much carb." 1141 using a voice utterance application (e.g., Bixby™) to express the meaning that the bread has too many calories. For another example, in case of FIG. 11B, the processor 120 may output the voice "Pick me to drink more! More water means more hydrated skin!" 1142 using the voice utterance application to express the meaning that it is good to drink water. For another example, in case of FIG. 11C, the processor 120 may output the voice "Pick me! I'm full of vitamin C!" 1142 using the voice utterance application to express the meaning that the fruit is rich in vitamins.

Figure 12:
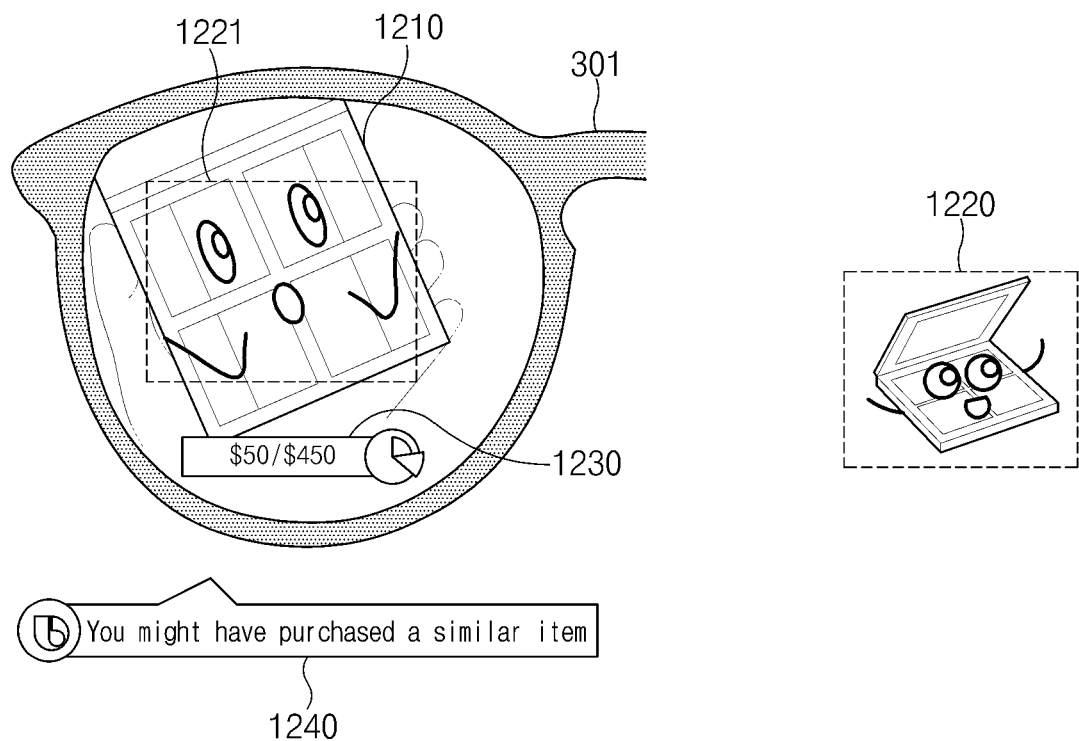
FIG. 12 is a drawing illustrating displaying an additional object on an object of an augmented reality image viewed by an external device based on stored information in an electronic device according to an embodiment.

FIG. 12 is a drawing illustrating displaying an additional object 1221 on an object 1210 of an augmented reality image viewed by an external device 301 based on stored information in an electronic device 101 according to an embodiment.

In an embodiment, a memory 130 of the electronic device 101 may store stored information 1220 including usage pattern data in which usage patterns of a user are accumulated. A processor 120 of the electronic device 101 may determine whether the object 1210 of the augmented reality image viewed by the external device 301 is the object 1210 meaningful to the user based on the stored information 1220 stored in the memory 130. For example, when the object 1210 of the augmented reality image viewed by the external device 301 is an item, the processor 120 may determine whether information associated with the item previously purchased by the user is stored in the memory 130. When the information associated with the previously purchased item is stored in the memory 130, the processor 120 may set the information associated with the previously purchased item to the stored information 1220 and may determine that the object 1210 of the augmented reality image is the object 1210 meaningful to the user.

In an embodiment, the processor 120 of the electronic device 101 may set the external device 301 to display the additional object 1221 on the object 1210 based on the stored information. The external device 301 may provide the user with an augmented reality image displaying the additional object 1221 on the object 1210. For example, when the stored information 1220 is the information associated with the previously purchased item, the processor 120 may set the external device 301 to generate a facial expression providing a notification that the object 1210 is similar to the previously purchased item as the additional object 1221.

In an embodiment, the processor 120 of the electronic device 101 may run an application associated with the object 1210 based on the object 1210 and the stored information 1220. The external device 301 may display a running screen 1230 of the application associated with the object 1210 on the augmented reality image. For example, when the object 1210 is an item and when the stored information 1220 is the information associated with the previously purchased item, the processor 120 may run a payment-related application (e.g., Samsung Pay™) for pay for the item. The external device 301 may display a price of the object 1210 and target expenditure set by the application on the running screen 1230.

In an embodiment, the processor 120 of the electronic device 101 may be configured to output a voice 1240 corresponding to a meaning the additional object 1221 wants to express by means of the electronic device 101 or the external device 301. For example, the processor 120 may output the voice "You might have purchased a similar item." using the voice utterance application (e.g., Bixby™) to express that the object 1210 is similar to the previously purchased item.

An electronic device 101 according to various embodiments may include a communication module 190, a display 210, and at least one processor 120 operatively connected with the communication module 190 and the display 210. The at least one processor 120 may be configured to receive an augmented reality image from at least one external device 301 performing wireless communication with the communication module 190 via the communication module 190, display a running screen of an application associated with the augmented reality image on the display 210, determine whether an object 511 associated with input information input to the electronic device 101 is included in the augmented reality image, and display an additional object 521 on the object 511 based at least in part on the input information.

In an embodiment, the at least one processor 120 may be configured to generate the input information based at least in part on information set directly by a user or information according to a situation outside the electronic device 101.

In an embodiment, the at least one processor 120 may be configured to set a priority of the object 511 based at least in part on information set directly by a user or a situation outside the electronic device 101 and recognize the object 511, the priority of which is high.

In an embodiment, the at least one processor 120 may be configured to determine whether the object 511 is meaningful to a user based at least in part on information set directly by the user or a situation outside the electronic device 101 and recognize the meaningful object.

In an embodiment, the at least one processor 120 may be configured to generate the additional object 521 to be at least partially overlapped with the object 511 and allow the additional object 521 to have a face shape representing an emotion.

In an embodiment, the at least one processor 120 may be configured to allow the additional object 521 to express the emotion as any one of a plurality of emotion stages included between a positive emotion and a negative emotion based at least in part on the input information.

In an embodiment, the at least one processor 120 may be configured to change an emotion expressed by the additional object 521 or a shape of the additional object 521 depending on a type of the object 511 or a change in a state of the object 511.

In an embodiment, the at least one processor 120 may be configured to generate a shape of the additional object 521 based at least in part on a shape of the object 511 or a length ratio of the object 511.

An electronic device 101 according to various embodiments may include a communication module 190, a display 210, a memory 130, and at least one processor 120 operatively connected with the communication module 190, the display 210, and the memory 130. The at least one processor 120 may be configured to receive an augmented reality image from at least one external device 301 performing wireless communication with the communication module 190 via the communication module 190, display a running screen of an application associated with the augmented reality image on the display 210, determine whether an object 511 associated with stored information stored in the memory 130 is included in the augmented reality image, and display an additional object 521 on the object 511 based at least in part on the stored information.

In an embodiment, the at least one processor 120 may be configured to generate the stored information based at least in part on usage pattern data in which usage patterns of a user are accumulated.

In an embodiment, the at least one processor 120 may be configured to set a priority of the object 511 based at least in part on usage pattern data in which usage patterns of a user are accumulated and recognize the object 511, the priority of which is high.

In an embodiment, the at least one processor 120 may be configured to determine whether the object 511 is meaningful to a user based at least in part on usage pattern data in which usage patterns of the user are accumulated and recognize the meaningful object 511.

A driving method of an electronic device 101 according to various embodiments may include receiving an augmented reality image from at least one external device 301 performing wireless communication with the electronic device 101, displaying a running screen of an application associated with the augmented reality image on a display 210, determining whether an object 511 associated with at least one of first information input by a user and second information stored in a memory is included in the augmented reality image, and generating at least one of a first additional object based on the first information and a second additional object based on the second information on the object 511.

In an embodiment, the driving method may further include generating the first information based at least in part on information set directly the user or information according to a situation outside the electronic device 101 or generating the second information based at least in part on usage pattern data in which usage patterns of the user are accumulated.

In an embodiment, the driving method may further include setting a priority of the object 511 based at least in part on information set directly by the user or a situation outside the electronic device 101 and recognizing the object 511, the priority of which is high.

In an embodiment, the driving method may further include setting a priority of the object 511 based at least in part on usage pattern data in which usage patterns of the user are accumulated and recognizing the object 511, the priority of which is high.

In an embodiment, the driving method may further include determining whether the object 511 is meaningful to the user based at least in part on information set directly by the user, a situation outside the electronic device 101, or usage pattern data in which usage patterns of the user are accumulated and recognize the meaningful object 511.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a communication module;
a display; and
at least one processor operatively connected with the communication module and the display,
wherein the at least one processor is configured to:
receive an augmented reality image from at least one external device performing wireless communication with the communication module via the communication module;
display a running screen of an application associated with the augmented reality image on the display;
determine whether an object associated with input information input to the electronic device is included in the augmented reality image; and
display an additional object on the object based at least in part on the input information.

2. The electronic device of claim 1, wherein the at least one processor is configured to:
generate the input information based at least in part on information set directly by user or information according to a situation outside the electronic device.

3. The electronic device of claim 1, wherein the at least one processor is configured to:
set a priority of the object based at least in part on information set directly by user or a situation outside the electronic device and recognize the object, the priority of which is high.

4. The electronic device of claim 1, wherein the at least one processor is configured to:
determine whether the object is meaningful to user based at least in part on information set directly by the user or a situation outside the electronic device and recognize the meaningful object.

5. The electronic device of claim 1, wherein the at least one processor is configured to:
generate the additional object to be at least partially overlapped with the object and allow the additional object to have a face shape representing an emotion.

6. The electronic device of claim 5, wherein the at least one processor is configured to:
allow the additional object to express the emotion as any one of a plurality of emotion stages included between a positive emotion and a negative emotion based at least in part on the input information.

7. The electronic device of claim 5, wherein the at least one processor is configured to:

change an emotion expressed by the additional object or a shape of the additional object depending on a type of the object or a change in a state of the object.

8. The electronic device of claim 1, wherein the at least one processor is configured to:
generate a shape of the additional object based at least in part on a shape of the object or a length ratio of the object.

9. An electronic device, comprising:
a communication module;
a display;
a memory; and
at least one processor operatively connected with the communication module, the display, and the memory,
wherein the at least one processor is configured to:
receive an augmented reality image from at least one external device performing wireless communication with the communication module via the communication module;
display a running screen of an application associated with the augmented reality image on the display;
determine whether an object associated with stored information stored in the memory is included in the augmented reality image; and
display an additional object on the object based at least in part on the stored information.

10. The electronic device of claim 9, wherein the at least one processor is configured to:
generate the stored information based at least in part on usage pattern data in which usage patterns of user are accumulated.

11. The electronic device of claim 9, wherein the at least one processor is configured to:
set a priority of the object based at least in part on usage pattern data in which usage patterns of user are accumulated and recognize the object, the priority of which is high.

12. The electronic device of claim 9, wherein the at least one processor is configured to:
determine whether the object is meaningful to user based at least in part on usage pattern data in which usage patterns of the user are accumulated and recognize the meaningful object.

13. The electronic device of claim 9, wherein the at least one processor is configured to:
generate the additional object to be at least partially overlapped with the object and allow the additional object to have a face shape representing an emotion.

14. The electronic device of claim 13, wherein the at least one processor is configured to:
allow the additional object to express the emotion as any one of a plurality of emotion stages included between a positive emotion and a negative emotion based at least in part on the stored information.

15. The electronic device of claim 13, wherein the at least one processor is configured to:
change an emotion expressed by the additional object or a shape of the additional object depending on a type of the object or a change in a state of the object.

* * * * *